Nov. 17, 1959   L. C. EBEL ET AL   2,913,515
SHIELDED POLYETHYLENE INSULATED ELECTRIC CONDUCTOR
Filed Feb. 15, 1956
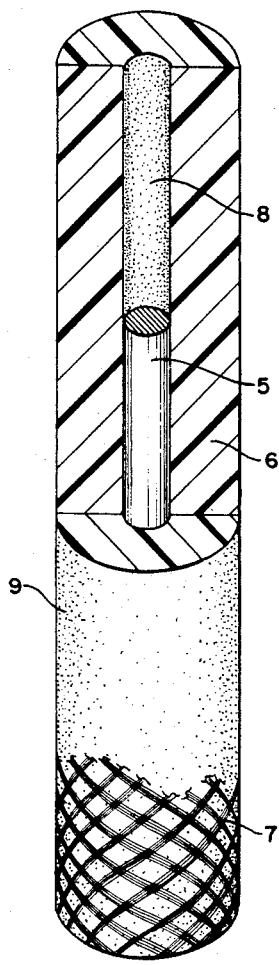
INVENTORS
RALPH G. D'ASCOLI
LAWRENCE C. EBEL
BY
Pennie, Edmonds, Morton, Barrows & Taylor
ATTORNEYS

United States Patent Office 2,913,515
Patented Nov. 17, 1959

2,913,515
SHIELDED POLYETHYLENE INSULATED ELECTRIC CONDUCTOR

Lawrence C. Ebel, Dobbs Ferry, and Ralph G. D'Ascoli, Yonkers, N.Y., assignors to Anaconda Wire and Cable Company, a corporation of Delaware Application February 15, 1956, Serial No. 565,609

7 Claims. (Cl. 174—102)

This invention relates to insulated electric conductors, and especially to conductors insulated with polyethylene. The invention aims to provide a novel and effective protection of the polyethylene insulation against the harmful effects of ionization.

Under normal conditions of handling, storage and installation, the polyethylene insulation of a shielded power cable or the like may separate slightly from the conductor or the conducting shield. The air gaps that form as a consequence of such separations provide short air paths between the polyethylene insulation and the conducting shield (on the outside) and/or the conductor (on the inside) which give rise to high electrical stresses or ionization, with attendant damage to the insulation, when a high potential is impressed on the cable. It has heretofore been proposed to minimize the harmful effects of such electrical disturbances on cable insulations of rubber, paper, varnished cambric and the like by the provision of a film coating of conducting material over the surface of the insulation, but due to the waxy nature of polyethylene insulation no conducting film coating possessing satisfactory adherence to polythylene has heretofore been available.

We have found that methylated paraffin possesses excellent adherence to polyethylene, but due to its inherent brittleness and tackiness it cannot be itself used for coating a polyethylene surface. We have discovered that these shortcomings of methylated paraffin can be overcome by combining therewith certain modifiers of its inherent brittleness and tackiness without impairing its excellent adherence to polyethylene. Thus the present invention involves the application to one or both surfaces of the polyethylene insulation of a finely adherent semi-conducting or conducting film coating containing methylated paraffin (combined with a suitable modifier) to eliminate air gaps between the insulation and the conductor and/or the conducting shield and thereby protecting the polyethylene insulation from the harmful effects of ionization.

Methylated paraffin is a polymerization product obtained by a catalytic reaction of a mixture of monomers having an average molecular weight of about 90 and composed essentially of dienes and reactive olefines to produce a hard, brittle and tacky resin with a resulting average molecular weight between 1000 and 1400, and preferably about 1100, and a ball and ring softening point of about 100° C. The polymerized reaction product may generally be defined as consisting for the most part of methylated paraffin chains with only a limited amount of unsaturated bonds. In practicing the invention, a methylated paraffin product marketed by Pennsylvania Industrial Chemical Corporation under the trade name of Piccopale gives very satisfactory results.

The invention will be better understood from the following description taken in conjunction with the single figure of the accompanying drawing illustrating an insulated electric cable embodying the invention.

The metallic conductor 5 of the cable illustrated in the drawing may be solid or stranded and is surrounded by a solid layer 6 of polyethylene insulation. A conducting shield of wire braid 7 surrounds the insulation 6. In accordance with the invention conducting film coatings 8 and 9, consisting essentially of methylated paraffin combined with a suitable modifier of its brittleness and tackiness, firmly adhere to the inner and outer surfaces or faces, respectively, of the polyethylene insulation 6.

Basically, the film coatings 8 and 9 consist of methylated paraffin and the conducting or semi-conducting solid particles such as carbon black. For the film coating 9 on the outside face of the polyethylene insulation polyvinyl acetate is a satisfactory modifying agent, while chlorinated paraffins are more satisfactory modifying agents for the film coating 8 on the inside face of the insulation. In general, the conducting film coating may be made up of from 25 to 50% methylated paraffin, 20 to 60% modifying agent and 10 to 50% carbon black.

The coating composition 9 for the outside of the insulation is conveniently prepared by dissolving the methylated paraffin and polyvinyl acetate in a mutual solvent such as ethylene dichloride, butyl acetate, methyl isobutyl ketone, or the like. The solvent promotes application of the composition in that it reduces viscosity sufficiently so that the composition may be applied by dipping, brushing, or by spraying when sufficient solvent is used. The amount of solvent is varied to suit the method of application, and since it evaporates from the applied coating it has no permanent effect on the ultimate coating. In addition to imparting flexibility to the coating and reducing tackiness, polyvinyl acetate improves the adhesion of the composition to the polyethylene insulation. We have used with excellent results the C-3 polymer marketed by Monsanto Chemical Co. as the polyvinyl acetate. The following formulation has given excellent practical results:

20 parts by weight of methylated paraffin
40 parts by weight of polyvinyl acetate
50 parts by weight of carbon black.

The methylated paraffin and polyvinyl acetate are mixed and covered with the solvent, and stirred until dissolved. The carbon black, preferably in the form of acetylene black, is then mixed in, and solvent is added in amount to impart the desired viscosity to the composition.

The large proportion of carbon black in the foregoing formulation produces a composition of relatively high conductivity. Stronger film coatings can be obtained by including less carbon black in the composition. However, the amount of carbon black cannot be reduced to less than about 10% by weight because the carbon black particles then become so dispersed as to lose contact with one another with attendant almost complete loss of conduction.

Application of a film coating over the conductor by means of a solvent composition is not desirable because the residual solvent vapor causes voids or blisters when the polyethylene insulation is subsequently applied. Hence, the composition for coating the inside of the insulation is prepared without solvent, and chlorinated paraffins are combined with the methylated paraffin to overcome its inherent brittleness and tackiness. We have obtained satisfactory practical results with the chlorinated paraffin products of Diamond Alkali Co., marketed under the trade names of Chlorowax 40 and Chlorowax 70. Chlorowax 40 is a light amber colored, non-toxic liquid containing 40 to 42% chlorine, and Chlorowax 70 is a cream-colored, non-toxic powder containing 68 to 73% chlorine. We have obtained excellent results with a coating composition of the following formulation:

40 parts by weight of methylated paraffin
20 parts by weight of Chlorowax 40
20 parts by weight of Chlorowax 70
20 parts by weight of Acrawax C, and
10 parts by weight of acetylene black.

Acrawax C is a trade name of Glyco Products Co. for octadecenamide, a hard, light tan synthetic wax of high luster. It reduces tackiness and raises the melt point of the composition, while the Chlorowaxes provide pliability and promote adhesion, although the high adhesive property of the composition for polyethylene is provided by the methylated paraffin. The composition is conveniently prepared by heating together and blending the first four ingredients and then mixing in the carbon black (acetylene black). Addition of the carbon black makes the mixture quite stiff and difficult to mix manually. With mechanical mixing a greater proportion—say twice as much—carbon black can be advantageously included in the composition. At room temperature this composition is a soft solid, which, when brought into contact with a heated conductor, melts to form a smooth, continuous coating around the conductor.

The solvent-less composition is applied by holding it in contact with the heated conductor as it enters the extruder with the polyethylene insulation. The heated conductor melts the composition and carries it along on its surface into the extrusion head where the composition bonds to the inner face of the hot polyethylene as it is extruded around the conductor. The heat and pressure exerted in the extruder bonds the film coating more firmly to the polyethylene than to the conductor, and hence in subsequent bending or stretching of the insulated conductor—although the conductor may loosen within the semi-conducting film coating—the coating maintains contact with the inner surface of the polyethylene insulation and thereby prevents void formation and ionization.

The solvent-less composition can be applied on the outside face as well as the inside face of the polyethylene insulation, although the solvent-type composition is better adapted for application to the outside surface of the insulation. With both types of composition, heat is necessary in order to effect a bond with the polyethylene. With the solvent-type composition heat is applied to the film coating and the polyethylene surface. In the solvent-less composition, the polyethylene in the extruder is hot enough to effect a bond.

The following example illustrates the effectiveness of the invention in protecting the polyethylene insulation from the harmful effects of ionization. Two specimens of 5 kv. series street lighting cable with No. 8 AWG solid conductor were made with an extruded layer of polyethylene insulation, one with and one without the conducting film coating of the invention around the conductor. Immediately after extrusion, both specimens were free of ionization up to 8 kv.; the conductor of the invention being free of ionization up to 18 kv. The conductors were then stretched to loosen them as might happen in handling and installation. After this treatment, the specimen of the invention was still free of ionization up to 7.8 kv., whereas the other specimen showed ionization even below 1.0 kv.

We claim:

1. In an insulated electric conductor in which a layer of polyethylene insulation surrounds the conductor, the improvement which comprises a continuous conducting film coating firmly adhering to at least one face of the polyethylene insulation and providing protection against the harmful effects of ionization, said conducting film coating consisting essentially of from 25 to 50% by weight of methylated paraffin combined with from 20 to 60% by weight of a modifier of its inherent brittleness and tackiness, said modifier being selected from the group consisting of polyvinyl acetate and chlorinated paraffins, and said conducting film coating having carbon black particles uniformly dispersed therethrough in amount from about 10 to 50% by weight to impart to the film coating the aforesaid conducting property, all percentages being based on the combined weight of the film coating and carbon black particles.

2. In an insulated electric conductor in which polyethylene insulation surrounds the conductor and the outer face of the polyethylene insulation is shielded, the improvement which comprises a continuous film coating consisting essentially of from 25 to 50% by weight of methylated paraffin combined with from 20 to 60% by weight of polyvinyl acetate firmly adhering to the outer face of the polyethylene insulation, and carbon black particles uniformly dispersed throughout the film coating in amount of from 10 to 50% by weight, all percentages being based on the combined weight of the film coating and carbon black particles.

3. The improvement according to claim 2 in which the conducting film coating consists essentially of about 20 parts by weight of methylated paraffin, about 40 parts by weight of polyvinyl acetate and from 0 to 50 parts by weight of carbon black particles.

4. In an insulated electric conductor in which a layer of polyethylene insulation surrounds the conductor, the improvement which comprises a continuous film coating consisting essentially of from 25 to 50% by weight of methylated paraffin combined with from 20 to 60% by weight of chlorinated paraffins surrounding and firmly adhering to the inner face of the polyethylene insulation, and carbon black particles uniformly dispersed throughout the film coating in amount of from about 10 to 50% by weight, all percentages being based on the combined weight of the film coating and carbon black particles.

5. The improvement according to claim 4 in which the conducting film coating consists essentially of about 40 parts by weight of methylated paraffin, about 40 parts by weight of chlorinated paraffins, about 20 parts by weight of octadecenamide, and from 10 to 20 parts by weight of carbon black.

6. In an insulated electric conductor in which a layer of polyethylene insulation surrounds the conductor, the improvement which comprises a continuous conducting film coating consisting essentially of from 25 to 50% by weight of methylated paraffin combined with from 20 to 60% by weight of polyvinyl acetate firmly adhering to the outer face of the polyethylene insulation, a continuous conducting film coating consisting essentially of from 25 to 50% by weight of methylated paraffin and from 20 to 60% by weight of chlorinated paraffins surrounding and firmly adhering to the inner face of the polyethylene insulation, and carbon black particles uniformly dispersed throughout each of said film coatings in amount from about 10 to 50% by weight to impart thereto the aforesaid conducting property, all percentages being based on the combined weight of each film coating and carbon black particles.

7. The improvement according to claim 6 in which the continuous conducting film adhering to the outer face of the polyethylene insulation consists essentially of about 20 parts by weight of methylated paraffin, about 40 parts by weight of polyvinyl acetate, and from 10 to 50 parts by weight of carbon black particles, and the continuous conducting film coating surrounding and adhering to the inner face of the polyethylene insulation consists essentially of about 40 parts by weight of methylated paraffin, about 40 parts by weight of chlorinated paraffin, about 20 parts by weight of octadecenamide, and from 10 to 20 parts by weight of carbon black.

References Cited in the file of this patent

UNITED STATES PATENTS

| | | |
|---|---|---|
| 2,304,210 | Scott | Dec. 8, 1942 |
| 2,480,295 | Kent | Aug. 30, 1949 |
| 2,543,229 | Chapman | Feb. 27, 1951 |
| 2,551,087 | Barnhart | May 1, 1951 |
| 2,622,152 | Rosch | Dec. 16, 1952 |
| 2,642,366 | Rumberger | June 6, 1953 |
| 2,678,285 | Browning | May 11, 1954 |

OTHER REFERENCES

Plastics (publication), September 1944, pages 42–43. (In Div. 69.)

UNITED STATES PATENT OFFICE

CERTIFICATE OF CORRECTION

Patent No. 2,913,515                              November 17, 1959

Lawrence C. Ebel et al.

It is hereby certified that error appears in the printed specification of the above numbered patent requiring correction and that the said Letters Patent should read as corrected below.

Column 1, line 31, for "polythylene" read -- polyethylene --; column 4, line 12, for "0 to 50 parts" read -- 10 to 50 parts --; same column, line 69, list of references cited, under "UNITED STATES PATENTS", for "June 6, 1953" read -- June 16, 1953 --.

Signed and sealed this 3rd day of May 1960.

(SEAL)
Attest:

KARL H. AXLINE                                   ROBERT C. WATSON
Attesting Officer                             Commissioner of Patents